United States Patent
Williams et al.

(10) Patent No.: US 9,898,240 B2
(45) Date of Patent: Feb. 20, 2018

(54) SYSTEMS, DEVICES, AND METHODS RELATING TO AN ELECTRONIC DISPLAY

(75) Inventors: John S. Williams, Las Vegas, NV (US); Clifford Brent Brown, Smithfield, UT (US)

(73) Assignee: PRISMVIEW, LLC, Logan, UT (US)

( * ) Notice: Subject to any disclaimer, the term of this patent is extended or adjusted under 35 U.S.C. 154(b) by 1217 days.

(21) Appl. No.: 12/693,063

(22) Filed: Jan. 25, 2010

(65) Prior Publication Data

US 2011/0181493 A1    Jul. 28, 2011

(51) Int. Cl.
*G06F 3/14* (2006.01)
*G09F 15/00* (2006.01)
*G09F 9/30* (2006.01)
*G09F 9/33* (2006.01)
*G09F 19/22* (2006.01)

(52) U.S. Cl.
CPC .............. *G06F 3/1446* (2013.01); *G09F 9/30* (2013.01); *G09F 9/33* (2013.01); *G09F 15/00* (2013.01); *G09F 19/22* (2013.01); *G09G 2340/0414* (2013.01); *G09G 2340/0464* (2013.01)

(58) Field of Classification Search
CPC ......... G09G 3/3644; G09G 2340/0414; G09G 2340/0464; G06F 3/1446; G06F 3/14; G09F 19/22; G09F 9/30; G09F 9/33; G09F 15/00

USPC ..................................................... 345/1.1, 1.3
See application file for complete search history.

(56) References Cited

U.S. PATENT DOCUMENTS

| | | | |
|---|---|---|---|
| 6,104,414 A * | 8/2000 | Odryna et al. ................. 345/536 |
| 6,237,290 B1 | 5/2001 | Tokimoto et al. | |
| 6,583,771 B1 * | 6/2003 | Furuhashi ............. G06F 3/1446 345/1.1 |
| 2004/0061661 A1 * | 4/2004 | Kishita et al. ................. 345/1.1 |
| 2006/0001594 A1 * | 1/2006 | Dantinne ............... G06F 3/1446 345/1.1 |
| 2008/0198584 A1 | 8/2008 | Fouraux et al. | |
| 2008/0224950 A1 * | 9/2008 | Hashimoto ............ G09G 5/005 345/1.3 |
| 2009/0096711 A1 * | 4/2009 | Jang ...................... G06F 3/1446 345/1.3 |
| 2011/0063315 A1 * | 3/2011 | Ghosh .................. G06F 3/1423 345/536 |

* cited by examiner

*Primary Examiner* — William Boddie
*Assistant Examiner* — Saifeldin Elnafia
(74) *Attorney, Agent, or Firm* — Sughrue Mion, PLLC

(57) ABSTRACT

Systems, devices, and methods relating to an electronic display are disclosed. A method of operating a display system may include conveying visual content representing a contiguous image to a display system including a plurality of display panels, wherein each display panel is adjacent at least one mounting member. The method may further include selectively retrieving with each display panel of the plurality an associated subset of the visual content belonging thereto. In addition, the method may include displaying on a display device of each display panel the associated subset of the visual content.

24 Claims, 9 Drawing Sheets

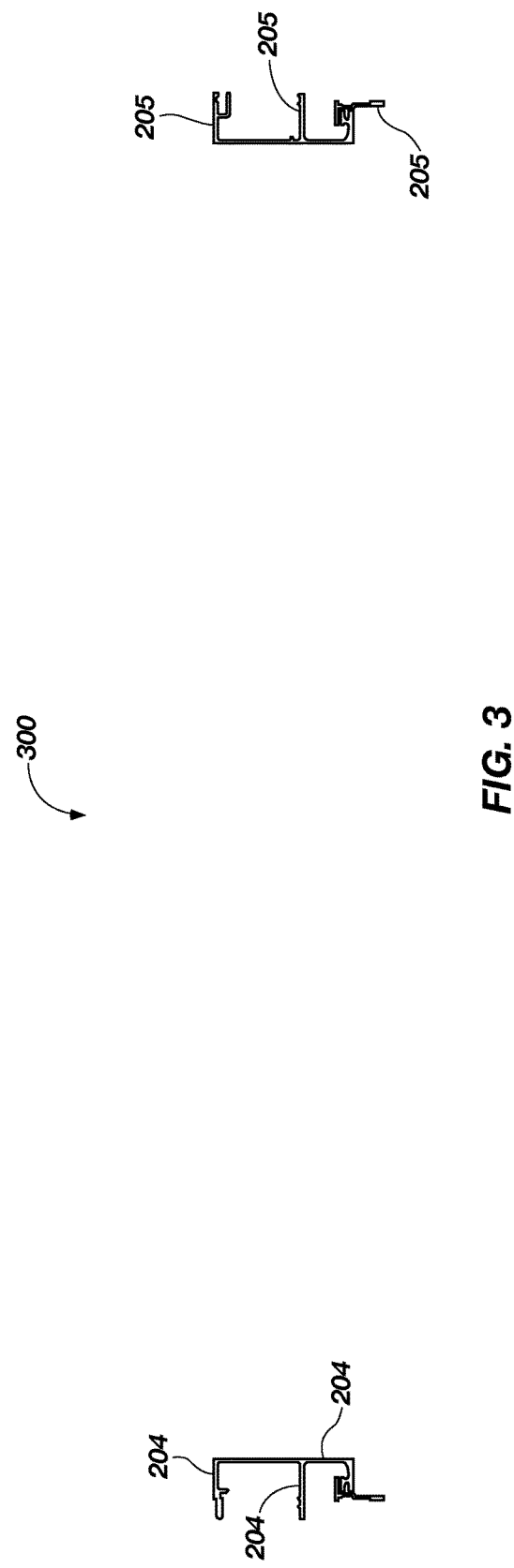

FIG. 7

SYSTEMS, DEVICES, AND METHODS RELATING TO AN ELECTRONIC DISPLAY

TECHNICAL FIELD

Embodiments of the present invention relate generally to electronic displays and, more specifically, to a display panel, systems including same, and methods of operation thereof.

BACKGROUND

Displays or signs, such as billboards, have been used for many years to convey information such as advertising, traffic messages, and the like. Furthermore, electronic displays, which may be seen along city streets and buildings, may utilize various electronic devices to display a wide variety of data in the form of words, images, or video without having to physically change the characteristics of the display. This data may include advertisements of goods and services, news, or any other form of visual data. This data may generally be referred to as visual content.

Electronic display devices are currently being applied to large-scale display applications, such as outdoor or indoor stadium displays, large marketing advertisement displays, and mass-public informational displays. Moreover, some large-scale display applications may utilize a large surface of a building, such as a modern high-rise office building. Such display devices, also known as curtain displays, may be viewed by an audience at a distance of more than 50 meters and require a large and complex support structure to hold the electronic display.

As known by one having ordinary skill in the art, large-scale electronic displays positioned on an outer surface of a building may include a plurality of display panels wherein each display panel may include a number of high-intensity light emitting diodes (LEDs) arranged in a grid, or matrix, at geometrically predetermined positions adjacent one another. For example, FIG. 1 illustrates a building 10 having a display 12 including a plurality of display panels 14. These types of display panels, including the structure for supporting the display panels, are substantially large and are made of materials that are heavy and, as such, are difficult to handle and transport. In addition to the physical problems associated with transportation, assembly, and disassembly, the time needed for replacement of such displays becomes yet another problematic factor. Furthermore, the heavy structure presently required for large scale displays may require that the existing support structures be reinforced, which increases the time and cost of installation. In addition, due to design limitations of conventional display panel structures, accessing panel component parts, such as the electrical components, has proven to be challenging. Moreover, because conventional panel displays emit a complete image across a contiguous area, a displayed image may appear distorted if panels are separated.

There is a need to enhance a display panel for use within a large-scale display. Specifically, there is a need for a display panel that provides for simplified access to component parts, replacement of components parts, replacement of the entire display panel, or any combination thereof. Moreover, a need exists for a method of displaying an image across a plurality of non-contiguous display panels to provide an undistorted image.

BRIEF SUMMARY OF THE INVENTION

An embodiment of the present invention comprises a method of operating a display system. The method may include conveying visual content representing a contiguous image to a display system including a plurality of display panels, wherein each display panel is adjacent at least one mounting member. The method may further include selectively retrieving with each display panel of the plurality an associated subset of the visual content belonging thereto. In addition, the method may include displaying on a display device of each display panel the associated subset of the visual content.

Another embodiment of the present invention includes a display panel. The display panel comprises a first member and a second member substantially parallel to and spaced from the first member. Further, the display panel includes a first side member and a second side member. Each of the first side member and the second side member extend from the first member to the second member, wherein the first side member is configured to be attached to a first mounting member oriented in a vertical direction and the second side member is configured to be attached to a second mounting member oriented in the vertical direction. The display panel also includes a display device including a plurality of display elements proximate the first member and an interior member parallel to each of the first member and the second member. The interior member extends from the first side member to the second side member, wherein a region between the second member and the interior member is configured to include at least one electrical component.

Another embodiment of the present invention includes a display system including one or more display panels. Each display panel may include a first side member and a second side member opposite the first side member, wherein each of the first side member and the second side member extend from a first member to a second member. Further, the first side member is configured to be attached to at least one mounting member and the second side member is configured to be attached to at least one other mounting member, Each display panel may also include an interior member positioned between and substantially parallel to each of the first member and the second member and extending from the first side member to the second side member. A region between the second member and the interior member is configured to store at least one electrical component.

Another embodiment of the present invention includes a display system. The display system includes a data source. Further, the display system includes a plurality of display panels, wherein each display panel is separated from an adjacent display panel by at least one mounting member. Each display panel is configured to retrieve a subset of visual content belonging thereto from the data source, wherein visual content configured to be displayed at a position of a mounting member of the at least one is not retrieved. Each display panel is further configured to display the retrieved subset of visual content on an associated display device.

Yet another embodiment of the present invention includes a computer-readable media storage medium storing instructions that, when executed by a processor, cause the processor to perform instructions for operating a display system according to one or more embodiments of the present invention.

BRIEF DESCRIPTION OF THE DRAWINGS

FIG. 3 illustrates a pair of vertical mounting members;

FIG. 7 illustrates a portion of a display including a plurality of display devices, a vertical mounting member, and a horizontal mounting member, according to an embodiment of the present invention.

DETAILED DESCRIPTION OF THE INVENTION

In this description, reference is made to the accompanying drawings which form a part hereof, and in which is shown, by way of illustration, specific embodiments in which the invention may be practiced. The embodiments are intended to describe aspects of the invention in sufficient detail to enable those skilled in the art to practice the invention. Other embodiments may be utilized and changes may be made without departing from the scope of the present invention. The following detailed description is not to be taken in a limiting sense, and the scope of the present invention is defined only by the appended claims.

Referring in general to the following description and accompanying drawings, various aspects of the present invention are illustrated to show its structure and method of operation. Common elements of the illustrated embodiments are designated with like numerals. It should be understood that the figures presented are not meant to be illustrative of actual views of any particular portion of the actual structure or method, but are merely idealized representations that are employed to more clearly and fully depict the present invention.

In this description, functions may be shown in block diagram form in order not to obscure the present invention in unnecessary detail. Furthermore, specific implementations shown and described are only examples and should not be construed as the only way to implement the present invention unless specified otherwise herein. Block definitions and partitioning of logic between various blocks represent a specific, non-limiting implementation. It will be readily apparent to one of ordinary skill in the art that the various embodiments of the present invention may be practiced by numerous other partitioning solutions. For the most part, details concerning timing considerations, and the like, have been omitted where such details are not necessary to obtain a complete understanding of the present invention in its various embodiments and are within the abilities of persons of ordinary skill in the relevant art.

When executed as firmware or software, the instructions for performing the methods and processes described herein may be stored on a computer readable medium. A computer readable medium includes, but is not limited to, magnetic and optical storage devices such as disk drives, magnetic tape, CDs (compact discs), DVDs (digital versatile discs or digital video discs), and semiconductor devices such as RAM, DRAM, ROM, EPROM, and Flash memory.

Figure 1:
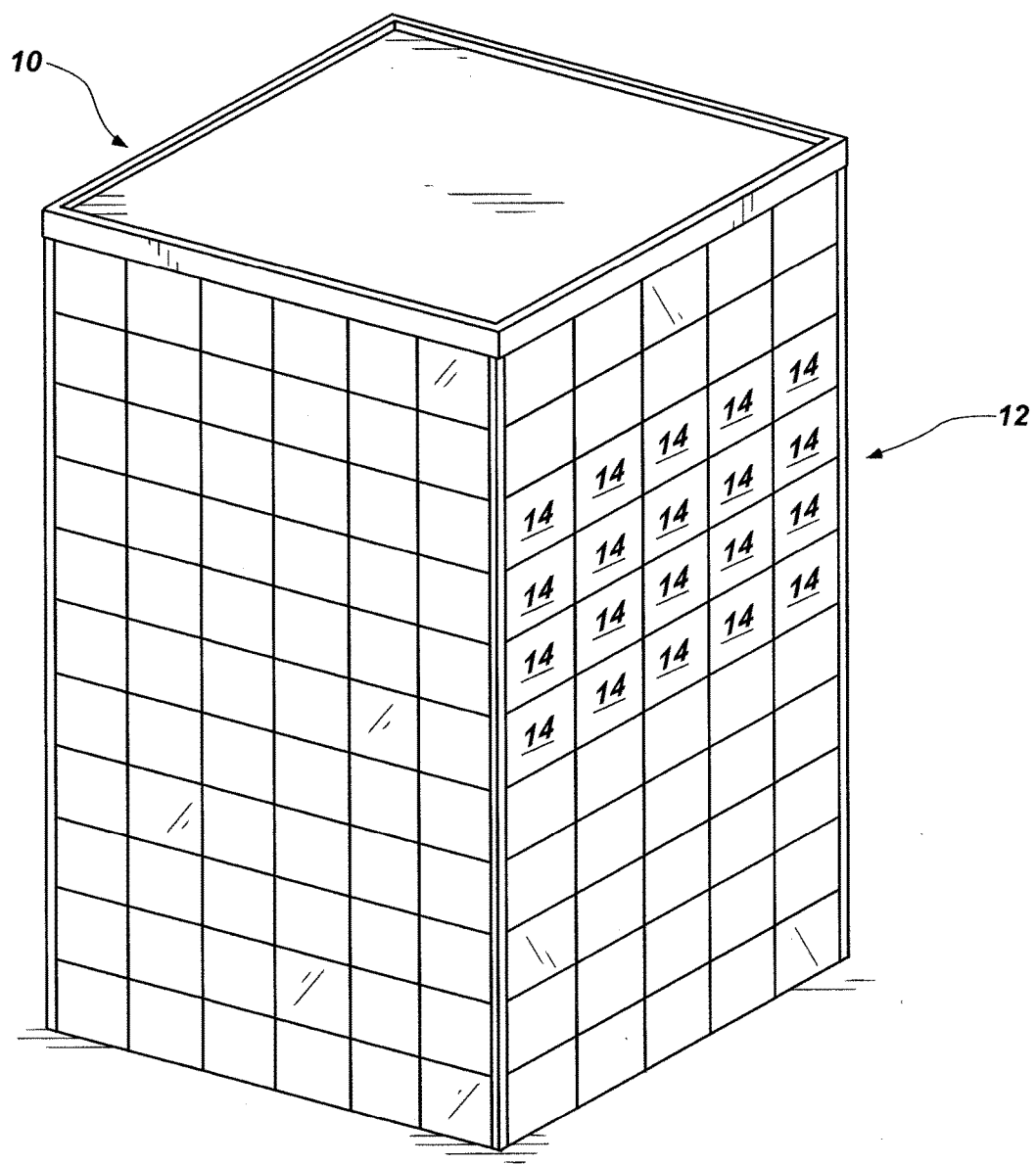
FIG. 1 depicts a building including a conventional electronic display having a plurality of display panels.
Figure 2:
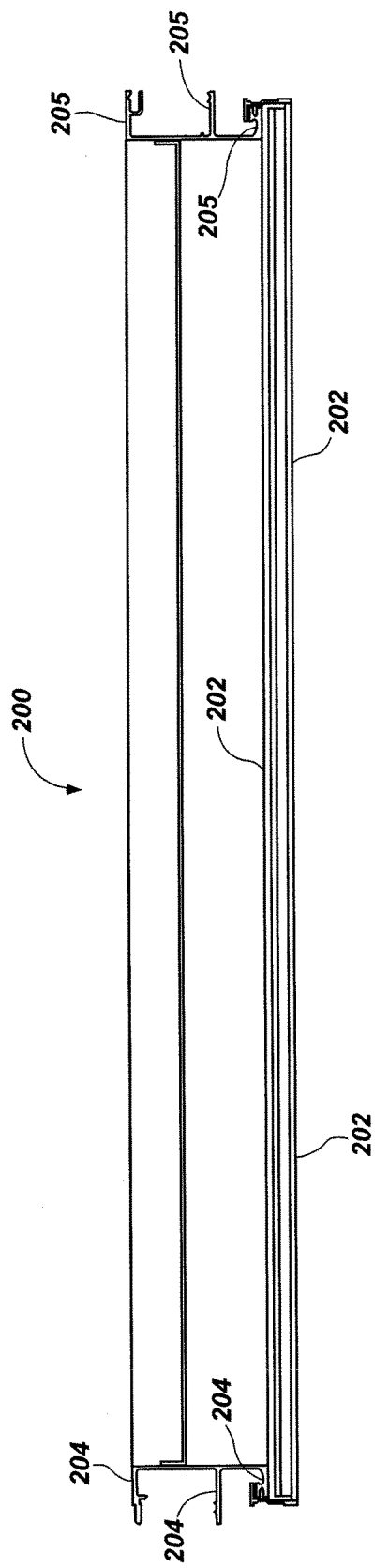
FIG. 2 illustrates a conventional window panel including a window and adjacent vertical mounting members.

FIG. 2 illustrates a planar view of a conventional window panel 200 including a window 202 and vertical mounting members 204 and 205. As a non-limiting example, mounting member 204 and mounting member 205 may each comprise a mullion. As will be understood by a person having ordinary skill in the art, a "mullion" is a structural element configured to be positioned between adjacent windows. It is noted that mounting members may be positioned in a vertical manner between horizontally adjacent windows and in a horizontal manner between vertically adjacent windows. For example only, and not by way of limitation, window panel 200 may comprise a window panel of a large-scale building, such as a high-rise building. FIG. 3 illustrates a planar view of a window panel 300 including vertical mounting members 204 and 205 wherein a window, previously existing, has been removed.

Figure 4A:
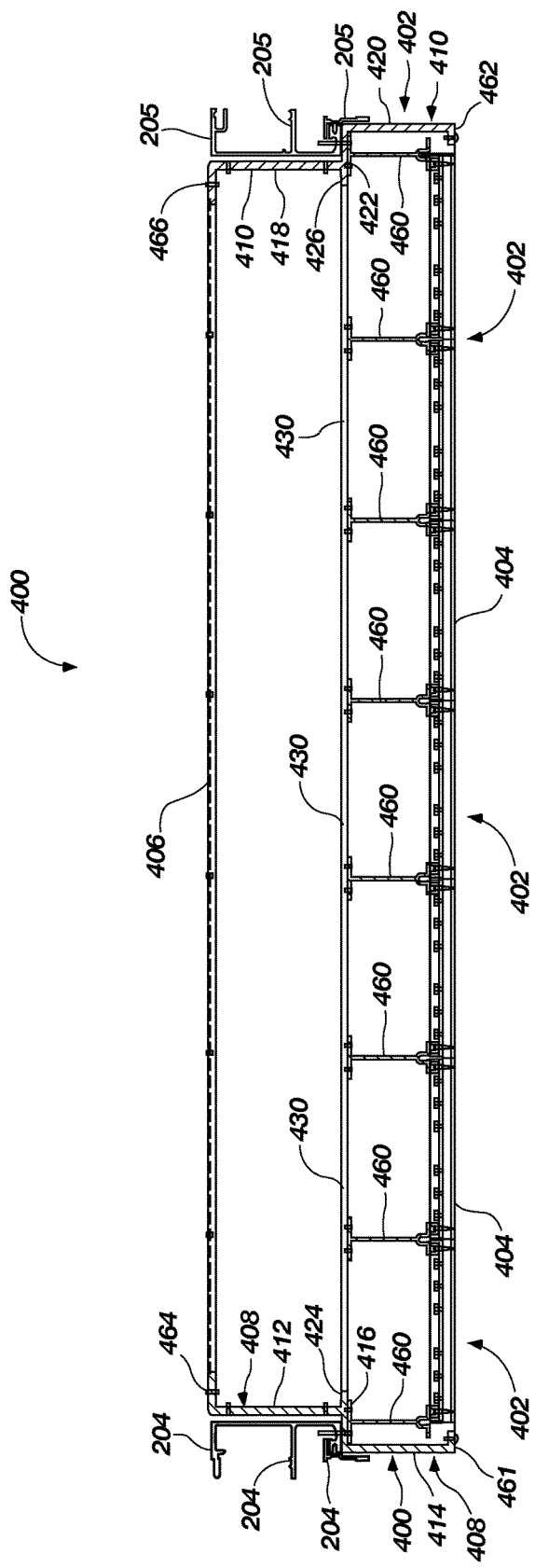
FIGS. 4A-4C each illustrate a display panel having a display device, in accordance with an embodiment of the present invention.
Figure 4B:
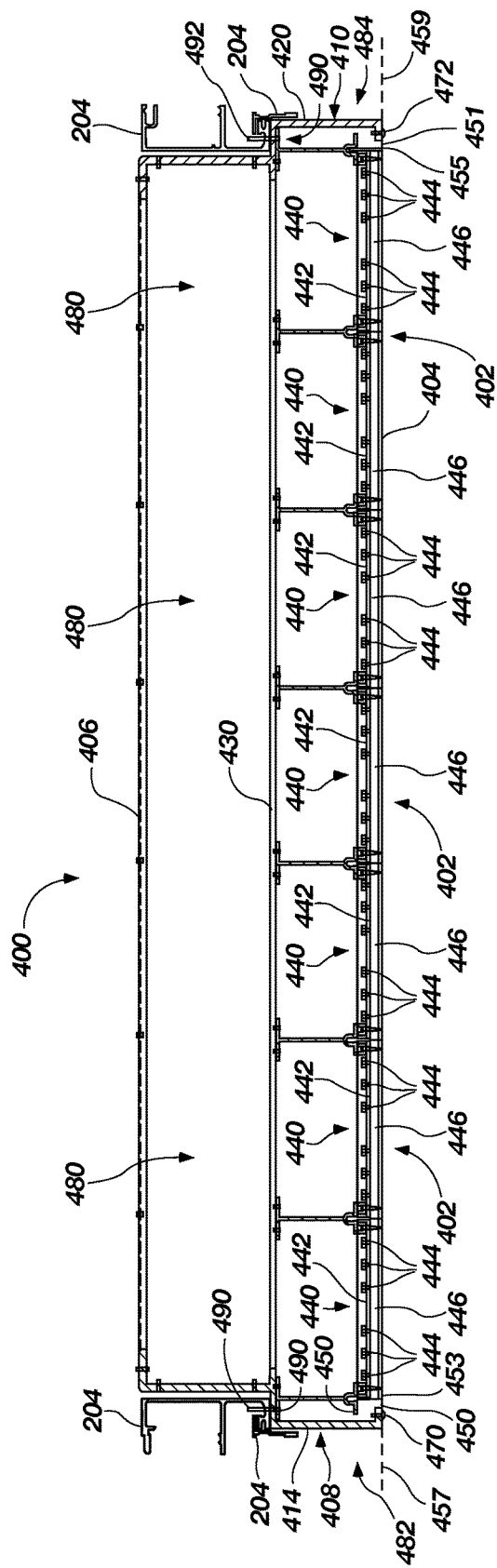
Figure 4C:
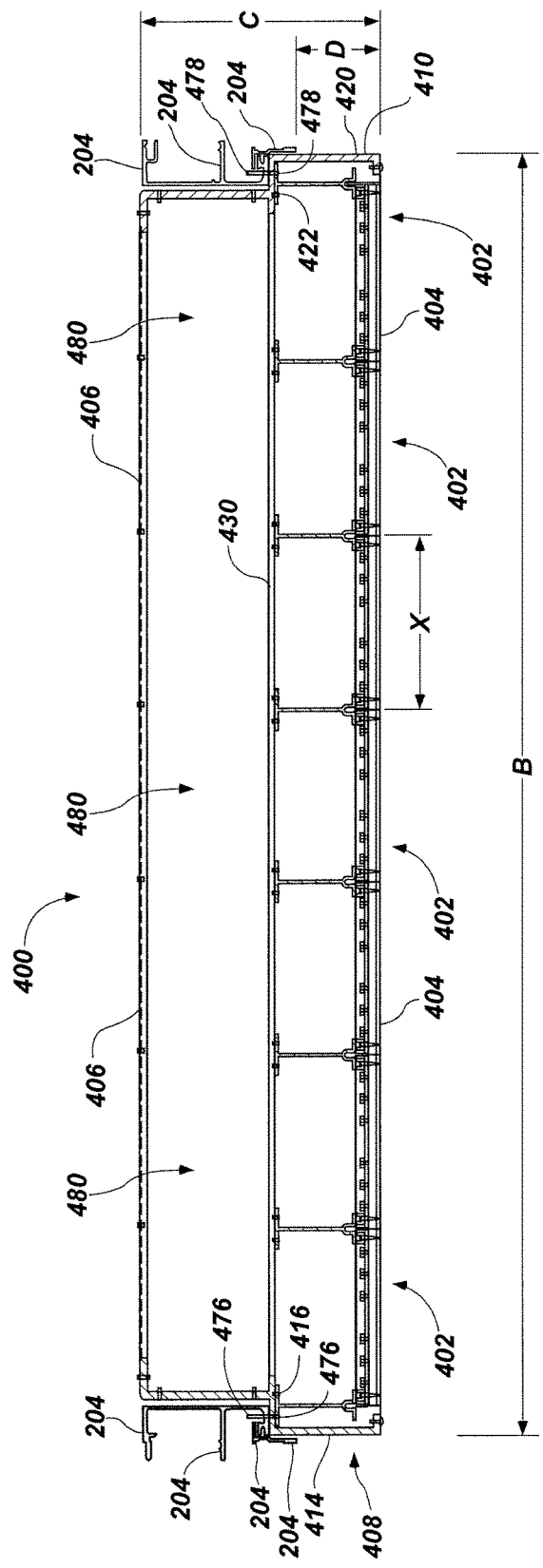

FIGS. 4A-4C each illustrate a planar view of a display panel 400 including a display device 402 positioned between vertical mounting members 204 and 205, in accordance with one or more embodiments of the present invention. Although embodiments of the present invention are described with reference to mounting members 204 and 205, embodiments of the present invention may be implemented with any known, suitable mounting member structure. As illustrated in FIG. 4A, display panel 400 includes a front member 404, a back member 406, a first side member 408, and a second side member 410. Moreover, first side member 408 includes a first portion 412, a second portion 414, and a shoulder 416 substantially parallel to each of front member 404 and back member 406. Furthermore, second side member 410 includes a first portion 418, a second portion 420, and a shoulder 422 substantially parallel to each of front member 404 and back member 406. For example only, back member 406, first side member 408, and second side member 410 may comprise an aluminum material. As a more specific example, back member 406 may comprise aluminum sheet metal.

Furthermore, shoulder 416 may include a portion 424 extending inwardly beyond first portion 412. Similarly, shoulder 422 may include a portion 426 extending inwardly beyond first portion 418. Additionally, first side member 408 may include a portion 461 extending inwardly beyond second portion 414 and second side member 410 may include a portion 462 extending inwardly beyond second portion 420. Each of portion 461 and portion 462 may be parallel to and in substantial alignment with front member 404. Moreover, first side member 408 may include a portion 464 extending inwardly beyond first portion 412 and second side member 410 may include a portion 466 extending inwardly beyond first portion 418. Each of portion 464 and portion 466 may be parallel to and in substantial alignment with back member 406. Display panel 400 may also include a interior member 430 substantially parallel to each of front member 404 and back member 406 and extending from first side member 408 (i.e., portion 424) to second side member 410 (i.e., portion 426). For example only, interior member 430 may comprise an aluminum material. As a more specific example, interior member 430 may comprise aluminum sheet metal. It is noted that a thickness of back member 406 may be less than a thickness of portion 464. Similarly, a thickness of interior member 430 may be less than a thickness of portion 424 or portion 426.

With reference to FIG. 4B, display device 402 may include a plurality of board structures 440 wherein each board structure 440 includes a board 442 having associated electrical circuitry (not shown) thereon and a plurality of display elements 444. For example only, display elements 444 may comprise LEDs. Furthermore, display device 402 may include a plurality of display cards 446 wherein each display card 446 may be secured to an associated board 442. As an example, display elements 444, which may be secured to an associated board 442, may protrude through holes (not shown) in an associated display card 446. As a non-limiting example, each display card 446 may have a width X (see FIG. 4C) of about eight inches.

Furthermore, display panel 400 may include a first trim cap 450 and a second trim cap 451 (see FIG. 4B). As depicted, first trim cap 450 extends from a first outer edge 453 of display device 402 to portion 461 (see FIG. 4A). Moreover, second trim cap 451 extends from a second outer edge 455 of display device 402 to portion 462 (see FIG. 4A). First trim cap 450 may be attached to portion 461 with attachment device 470 and second trim cap 451 may be attached to portion 462 with attachment device 472. For example only, attachment device 470 and attachment device 472 may each comprise a screw. In addition, first trim cap 450 may extend outwardly and may be attached to a side surface of a horizontally adjacent display panel (not shown), as indicated by broken line 457. Similarly, second trim cap 451 may extend outwardly and may be attached to a side surface of another horizontally adjacent display panel (not shown), as indicated by broken line 459.

With reference again to FIG. 4A, display panel 400 may also include a plurality of support members 460. As illustrated, each support member 460 may be substantially perpendicular to interior member 430 and may extend from interior member 430 to associated adjacent board structures 440 (see FIG. 4B). Each support member 460 may be secured to each of interior member 430 and board structures 440 in any known, suitable manner.

As illustrated in FIG. 4C, front member 404 may have a width B and first side member 408 and second side member 410 may each have a length C. By way of example and not limitation, width B may have a range of about four to five feet and length C may have a range of about six to twelve inches. Furthermore, as illustrated in each of FIG. 4A-4C, at least a portion of display panel 400, including display device 402, may protrude outwardly from an outer edge of each of mounting member 204 and mounting member 205. More specifically, as illustrated in FIG. 4C, display device 402 may protrude out a distance D from an outside edge of each of mounting member 204 and mounting member 205. For example only and not by way of limitation, distance D may have a range of about one to four inches.

As illustrated in FIG. 4C, shoulder 416 may be connected to mounting member 204 with an attachment device 476 and shoulder 422 may be connected to mounting member 205 with an attachment device 478. For example only, attachment devices 476 and 478 may each comprise a screw. Additionally, an adhesive (e.g., glue) may be placed between shoulder 416 and a portion of mounting member 204 and between shoulder 422 and a portion of mounting member 205 to further secure display panel 400 to mounting members 204 and 205.

According to one embodiment of the present invention, a region 480 positioned between back member 406 and interior member 430 may be configured to include, for example, a power supply, a controller, electrical circuitry, electrical wiring, or any other electrical component associated with display panel 400. Region 480 may have a depth Y, which may have a range of, for example only, about six inches. Furthermore, a region 482 (see FIG. 4B) positioned between first side member 408 and an adjacent mounting member (not shown) may be configured to include electrical wiring, electrical circuitry, or any other electrical component associated with display panel 400. Similarly, a region 484 positioned between second side member 410 and an adjacent mounting member (not shown) may be configured to include electrical wiring, electrical circuitry, or any other electrical component associated with display panel 400. It is noted that first trim cap 450 and second trim cap 451 may be configured to seal respective regions 482 and 484 from outside elements. It is further noted that all electronics required for operation of display panel 400 may be stored within region 480, region 482, or region 484, or any combination thereof.

In addition to being configured to attach to adjacent vertically oriented mounting members, display panel 400 may also be configured to attach to an adjacent horizontally oriented mounting member. More specifically, display panel 400 may be configured to attach to a horizontally oriented mounting member positioned above display panel 400. For example, a top surface of one or more of first side member 408, second side member 410, and back member 406 may be configured to attach to a horizontally oriented mounting member positioned above display panel 400. Furthermore, display panel 400 may be configured to attach to a horizontally oriented mounting member positioned below display panel 400. For example, a bottom surface of one or more of first side member 408, second side member 410, and back member 406 may be configured to attach to a horizontally oriented mounting member positioned below display panel 400.

Display panel 400 may allow for easy access to electrical components located within region 480, region 482, region 484, or any combination thereof. Therefore, replacement or repair of the electrical components may be simplified. Furthermore, because display panel 400 may be relatively lightweight and all electrical components for display panel 400 may be contained within region 480, region 482, or region 484, replacement of display panel 400 entirely may be relatively easy compared to a conventional display panel.

Figure 5:
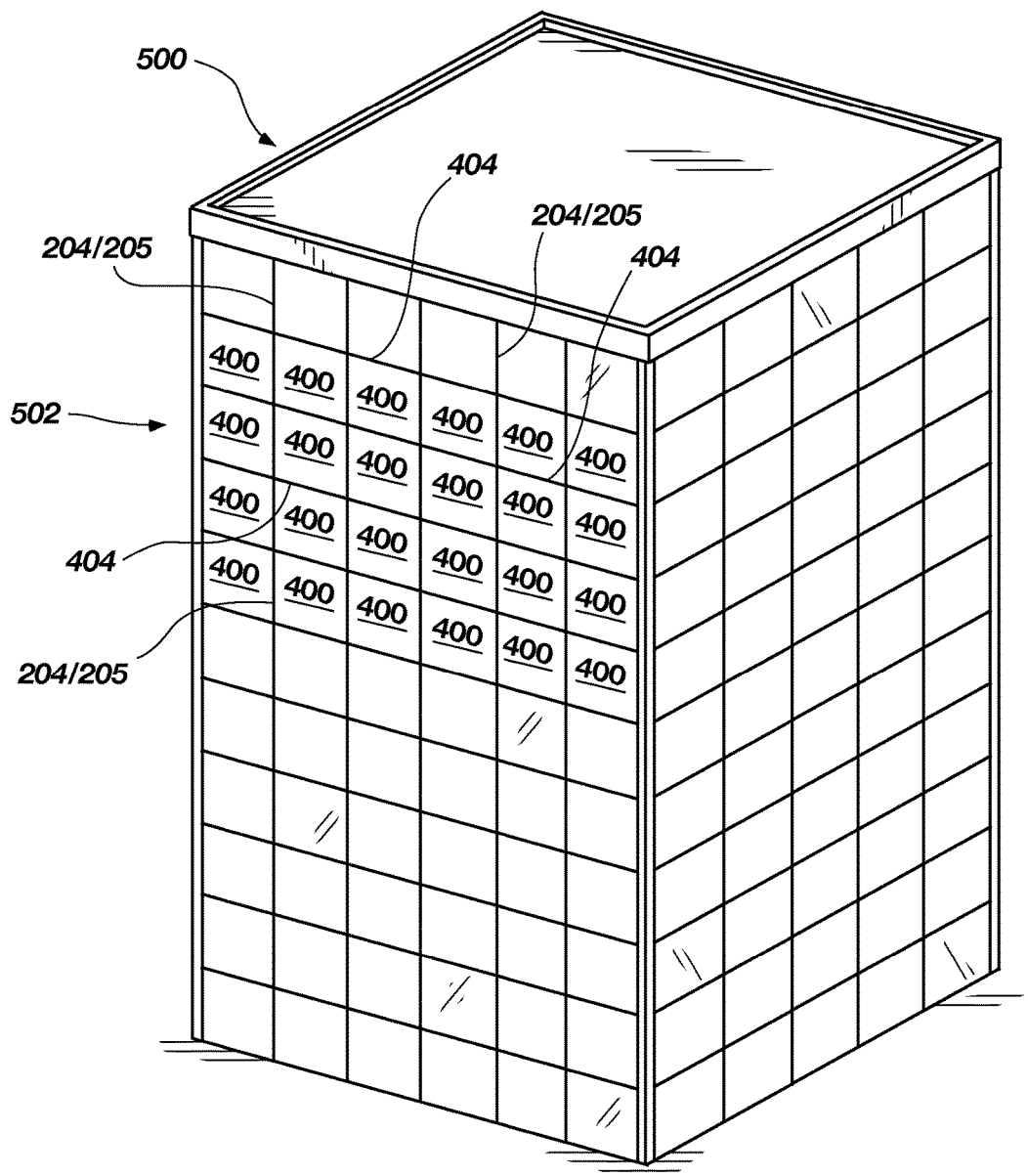
FIG. 5 illustrates an electronic display including a plurality of display panels, according to an embodiment of the present invention.

FIG. 5 illustrates a building 500 having an electronic display 502 including a plurality of display panels 400, in accordance with an embodiment of the present invention. As illustrated in FIG. 5, each display panel 400 is separated from a vertically adjacent display panel by a horizontal mounting member 404. Furthermore, each display panel 400 is separated from a horizontally adjacent display panel by vertical mounting members 204/205. As a non-limiting example, each of horizontal mounting member 404 and mounting members 204/205 may comprise a mullion.

Figure 6:
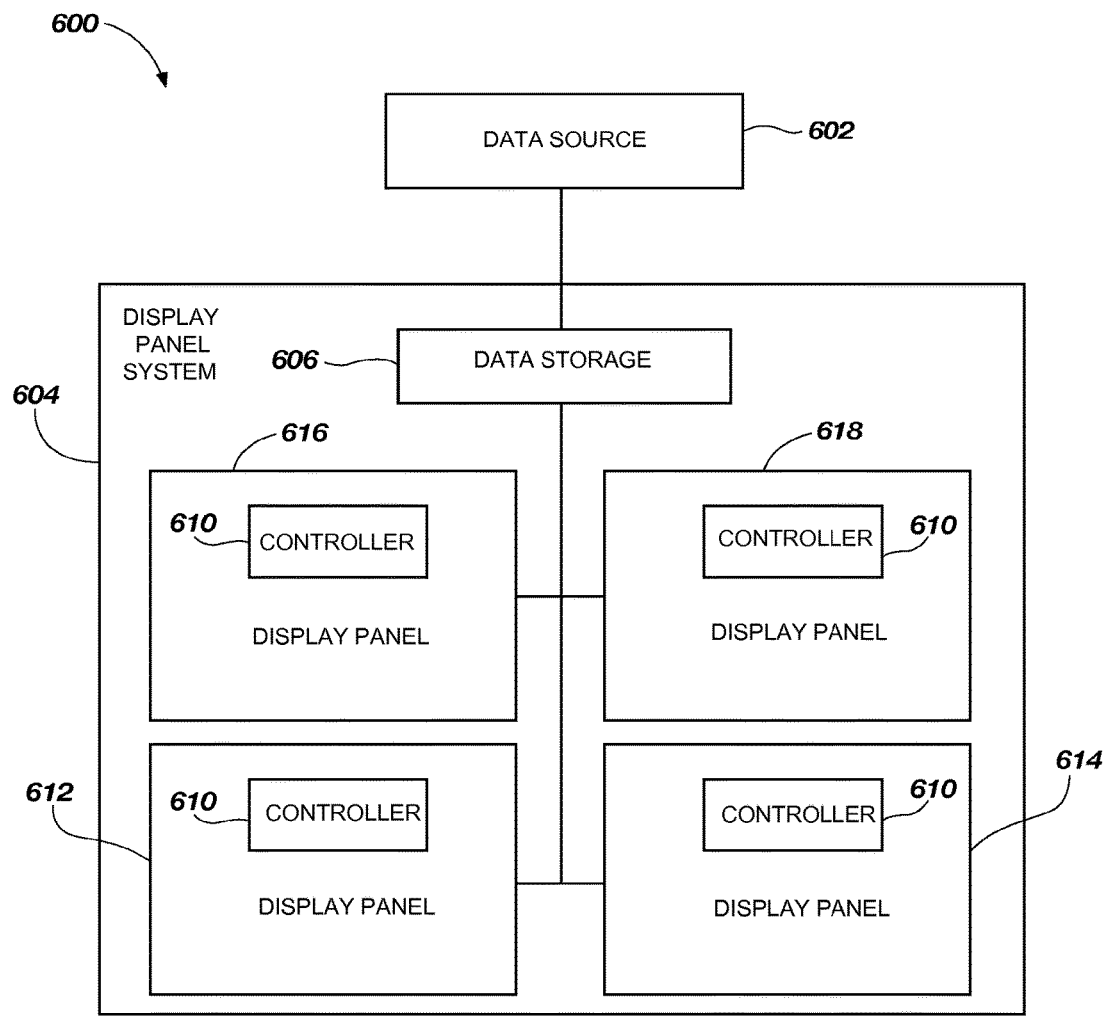
FIG. 6 illustrates a display system including a data source operably coupled to a display panel system, in accordance with an embodiment of the present invention.

FIG. 6 illustrates a display system 600 including a data source 602 operably coupled to a display panel system 604, in accordance with an embodiment of the present invention. Display panel system 604 may include a data storage 606 and a plurality of display panels 612, 614, 616, and 618. As illustrated, each display panel 612, 614, 616, and 618 is operably coupled to data storage device 606 and each display panel 612, 614, 616, and 618 includes a controller 610. Although only four display panels are illustrated in FIG. 6, display panel system 604 may comprise any number of display panels. Furthermore, it is noted that data source 602 may be integrated within display panel system 604 or, as illustrated, may be remote from display panel system 604.

Data source 602 may be configured to transmit visual content in the form of a contiguous array of data representing a contiguous image to data storage 606. According to one embodiment, each controller 610 may be configured to retrieve a subset of the visual content, belonging thereto, from data storage device 606. According to another embodiment, each controller 610 may be configured to retrieve a subset of the visual content, belonging thereto, from a data source, such as data source 602. Stated another way, in either embodiment, each controller 610 may be configured to retrieve a subset of the visual content, which it is configured to display on an associate display device. As mentioned above, the visual content may be in the form of an array of data and, furthermore, each element of the array of data may be identified by an address. Accordingly, for example only, each controller 610 may be configured to retrieve visual content using the addresses assigned to the visual content. After retrieving an associated subset of visual content, each controller 610 may be configured to display the retrieved visual content on an associated display device, as described more fully below with reference to FIG. 7.

Figure 7:
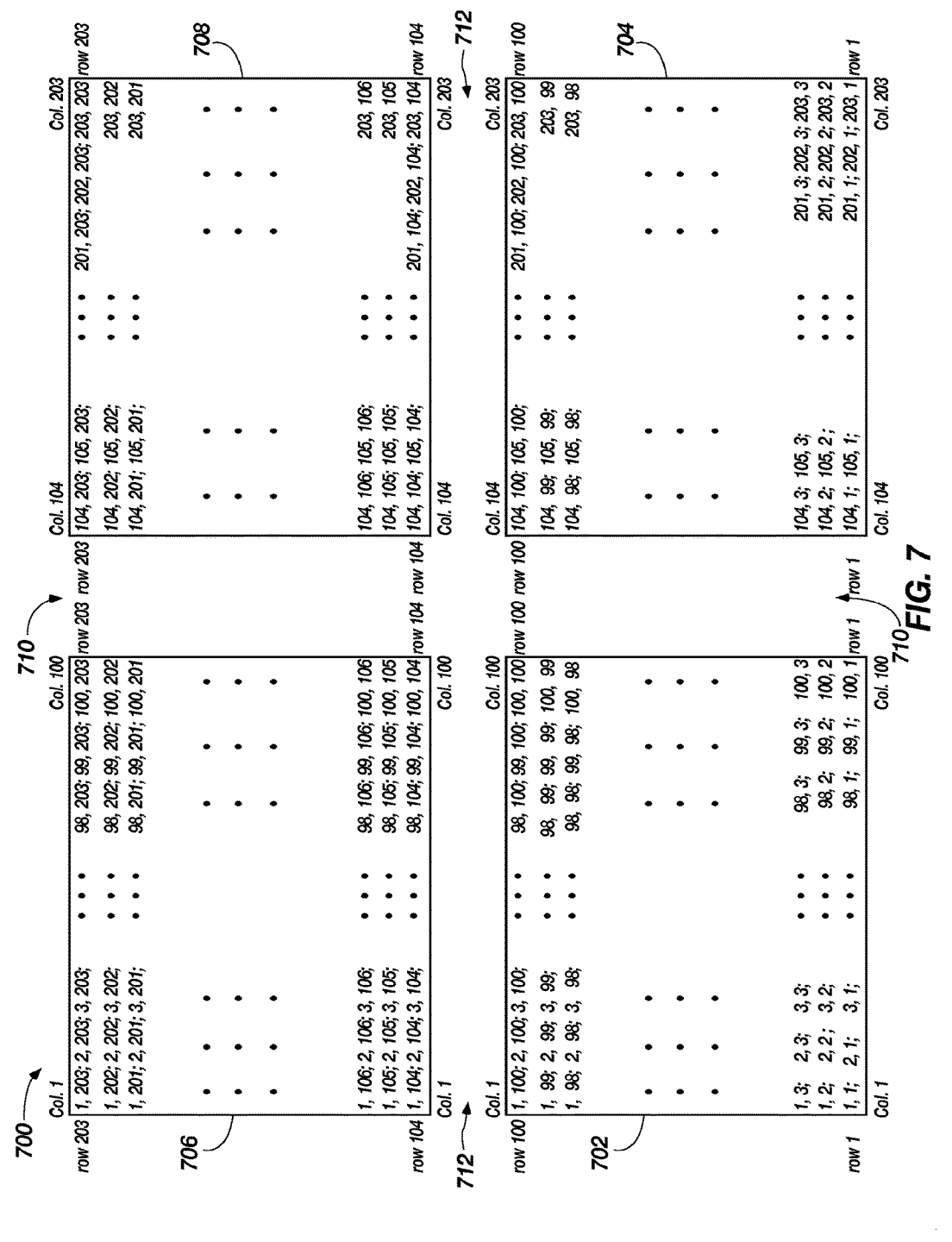

FIG. 7 illustrates a portion of a display 700 including display devices 702, 704, 706, and 708, vertical mounting member 710, and horizontal mounting member 712. Display devices 702, 704, 706, and 708 may comprise the display devices respectively associated with display panels 612, 614, 616, and 618, as illustrated in FIG. 6. Furthermore, each display device 702, 704, 706, and 708 includes a plurality of display elements (not shown) (e.g., display element 444; see FIG. 4B) arranged in an array of rows and columns. It is noted that each (column, row) position depicted in display devices 702, 704, 706, and 708 (e.g., "1, 1" at the bottom left corner of display device 702) represents a display element positioned on the display device.

As illustrated in FIG. 7, each display device 702, 704, 706, and 708 includes one hundred columns and one hundred rows. Stated another way, each display device 702, 704, 706, and 708 includes one hundred display elements in each row (i.e., rows 1-100 for display devices 702 and 704, and rows 104-203 for display devices 706 and 708) and one hundred display elements in each column (i.e., cols. 1-100 for display devices 702 and 706, and cols. 104-203 for display devices 704 and 708). Furthermore, display device 702 includes display elements at positions ranging from (cols. 1-100, rows 1-100), display device 704 includes display elements at positions ranging from (cols. 104-203, rows 1-100), display device 706 includes display elements at positions ranging from (cols. 1-100, rows 104-203), and display device 708 includes display elements at positions ranging from (cols. 104-203, rows 104-203). It is noted that although each display device 702, 704, 706, and 708 is illustrated as including 10,000 (100*100) display elements, display devices including any suitable number of display elements is within the scope of the present invention.

A contemplated method of displaying visual content on a display system will now be described with reference to FIGS. 6 and 7. Initially, visual content representing a contiguous image may be conveyed from data source 602 to data storage 606. More specifically, an array of data representing a contiguous image may be conveyed from data source 602 to data storage 606. Thereafter, a controller (e.g., controller 610) associated with each display device 702, 704, 706, and 708 may retrieve a subset of the visual content, belonging thereto, from data storage 606. Subsequently, each display device 702, 704, 706, and 708 may display the associated subset of the visual content, which it retrieved.

As mentioned above, data source 602 is configured to convey an array of data representing a contiguous image to data storage 606. However, as will be understood by a person having ordinary skill in the art, due to at least one mounting member being positioned adjacent each display device 702, 704, 706, and 708, display 700 is not configured to display a contiguous image across display devices 702, 704, 706, and 708. Therefore, according to one or more embodiments of the present invention, the visual content within data storage 606 that is configured to be displayed at a position associated with a mounting member (e.g., mounting members 710, 712) will not retrieved by any display device and, therefore, will not be displayed by display 700.

More specifically, with respect to row 1, display device 702 is configured to retrieve visual content configured to be displayed at cols. 1-100 (i.e., 1, 1; 2, 1; 3, 1; . . . 98, 1; 99, 1; 100, 1). Continuing across row 1, display device 704 is configured to retrieve visual content configured to be displayed at cols. 104-203 (i.e., 104, 1; 105, 1; . . . 201, 1; 202, 1; 203, 1). Therefore, in this example, the visual content stored within data storage 606 and configured to be displayed at cols. 101-103 in row 1 is not retrieved by any display device and, therefore is not displayed by display 700. Similarly, the visual content stored within data storage 606 and configured to displayed in cols. 101-103 for every other row (i.e., rows 2-203) of display 700 is not retrieved by any display device and, therefore, is not displayed by display 700. Stated another way, all visual content in data storage 606 that is configured to be displayed in either col. 101, col. 102, or col. 103 (i.e., at a position associated with a mounting member 710) will not be retrieved by any display device and, therefore, will not be displayed by display 700. As a result, visual content stored within data storage 606 and configured to be positioned at a location associated with mounting member 710 is not retrieved by any display device and, therefore, is not displayed by display 700.

Furthermore, with reference to col. 1, display device 702 is configured to retrieve visual content configured to be displayed at rows 1-100 (i.e., 1, 1; 1, 1; 1, 3; . . . 1, 98; 1, 99; 1, 100). Continuing with col. 1, display device 706 is configured to retrieve visual content configured to be displayed at rows 104-203 (i.e., 1, 104; 1, 105; 1, 106; . . . 1, 201; 1, 202; 1, 203). Therefore, in this example, the visual content stored within data storage 606 and configured to be displayed at col. 1 and rows 101-103 is not retrieved by any display device and, therefore, is not displayed by display 700. Similarly, the visual content stored within data storage 606 and configured to be displayed in rows 101-103 for every other col. (i.e., cols. 2-203) of display 700 is not retrieved by any display device and, therefore, is not displayed by display 700. Stated another way, all visual content in data storage 606 that is configured to be displayed in either row 101, row 102, or row 103 (i.e., at a position associated with a mounting member 712) will not be retrieved by any display device and, therefore, will not be displayed by display 700. As a result, visual content stored within data storage 606 and configured to be positioned at a location associated with mounting member 712 is not retrieved by any display device and, therefore, is not displayed by display 700.

As mentioned above, conventional display systems may display a complete image across a non-contiguous display, and therefore, the displayed image may be skewed or distorted. In comparison, display systems, in accordance with various embodiments of the present invention, are configured to display an image across a non-contiguous display, wherein parts of the image configured to be displayed at a location of a dead space (i.e., a mounting member) are ignored. Therefore, display systems, according to various embodiments of the present invention, may display an undistorted image, which, to the human eye, may appear to be contiguous.

While the present invention has been described herein with respect to certain preferred embodiments, those of ordinary skill in the art will recognize and appreciate that it is not so limited. Rather, many additions, deletions, and modifications to the preferred embodiments may be made without departing from the scope of the invention as hereinafter claimed. In addition, features from one embodiment may be combined with features of another embodiment while still being encompassed within the scope of the invention as contemplated by the inventors.

What is claimed is:

1. A method of operating a display system, comprising:
conveying visual content representing a contiguous image to a data storage of a display system including a plurality of display panels, each of the plurality of display panels being directly connected to the data storage without another intervening display panel, and comprising a corresponding controller of a plurality of controllers, the visual content comprising an array of data, each element of the array of data being identified by a corresponding address of a plurality of addresses;
initiating a selective retrieval, from the data storage, by the corresponding controller of each of the plurality of display panels, of only a corresponding subset of the array of data using a corresponding range of the plurality of addresses;
retrieving only the corresponding subset of the array of data from the data storage; and
displaying the corresponding retrieved subset of the array of data on each of the plurality of display panels,
wherein at least a portion of the visual content conveyed to the data storage is not retrieved.

2. The method of claim 1, wherein each element of the array of data is identified by a unique address of the plurality of addresses.

3. A non-transitory computer-readable media storing instructions that when executed by a processor cause the processor to perform instructions for operating a display system including a plurality of display panels, each of the plurality of display panels including a corresponding controller of a plurality of controllers, the instructions comprising:
conveying visual content representing a contiguous image to a data storage of the display system, each of the plurality of display panels being directly connected to the data storage without another intervening display panel, the visual content comprising an array of data, each element of the array of data being identified by a corresponding address of a plurality of addresses;
initiating a selective retrieval, from the data storage, by the corresponding controller of each of the plurality of display panels, of only a corresponding subset of the array of data using a corresponding range of the plurality of addresses;
retrieving only the corresponding subset of the array of data from the data storage; and
displaying the corresponding subset of the array of data as retrieved on each of the plurality of display panels,
wherein at least a portion of the visual content conveyed to the data storage is not retrieved.

4. The non-transitory computer-readable media of claim 3, wherein each element of the array of data is identified by a unique address of the plurality of addresses.

5. A display system, comprising:
a plurality of controllers;
a data storage configured to store visual content comprising an array of data, each element of the array of data being identified by a corresponding address of a plurality of addresses; and
a plurality of display panels, each of the plurality of display panels being directly connected to the data storage without another intervening display panel, and comprising a corresponding controller of the plurality of controllers,
wherein each of the plurality of controllers is configured to:
initiate a selective retrieval from the data storage, of only a corresponding subset of the array of data, using a corresponding range of the plurality of addresses;
retrieve only the corresponding subset of the array of data from the data storage; and
control a corresponding display to display the corresponding retrieved subset of the array of data,
wherein at least a portion of the visual content stored on the data storage is not retrieved.

6. The display system of claim 5, wherein the array of data represents a contiguous image.

7. The display system of claim 6, wherein each element of the array of data is identified by a unique address of the plurality of addresses.

8. The display system of claim 6, wherein each of the plurality of controllers is configured to display the corresponding subset of the visual content such that the contiguous image is recreated on the plurality of display panels with portions of the contiguous image not being displayed where there is dead space created by at least one mounting member.

9. The display system of claim 5, wherein visual content corresponding to addresses of the plurality of addresses associated with locations between the plurality of display panels is ignored by the plurality of controllers.

10. The display system of claim 5, wherein each corresponding range of the plurality of addresses indicates a first element a first corner of the corresponding display and a second corner of the corresponding display.

11. The display system of claim 5, wherein the portion of the visual content stored on the data storage that is not retrieved is outside of each corresponding range of the plurality of addresses.

12. The display system of claim 5, wherein the plurality of display panels comprises a first display panel comprising a first controller of the plurality of controllers, and a second display panel comprising a second controller of the plurality of controllers,
the corresponding range of the plurality of addresses selectively retrieved by the first controller corresponds to a first column and a first row of the display system through an Xth column and a Yth row of the display system,
the corresponding range of the plurality of addresses selectively retrieved by the second controller corresponds to the first column and a Y+Nth row of the display system through the Xth column and a Y+Y+Nth row of the display system, and
X, Y and N are positive integers.

13. The display system of claim 12, wherein the plurality of display panels comprises a third display panel comprising a third controller of the plurality of controllers, and a fourth display panel comprising a fourth controller of the plurality of controllers,
the corresponding range of the plurality of addresses selectively retrieved by the third controller corresponds to an X+Mth column and the first row of the display system through an X+X+Mth column and the Yth row of the display system,
the corresponding range of the plurality of addresses selectively retrieved by the fourth controller corresponds to the X+Mth column and a Y+Nth row of the display system through the X+X+Mth column and a Y+Y+Nth row of the display system, and
M is a positive integer.

14. The display system of claim 5, wherein at least one display panel of the plurality of display panels includes:
- a first member and a second member substantially parallel to and spaced from the first member;
- a first side member and a second side member each extending from the first member to the second member, wherein the first side member is configured to be attached to a first mounting member oriented in a vertical direction and the second side member is configured to be attached to a second mounting member oriented in the vertical direction;
- an associated display device including a plurality of display elements proximate the first member; and
- an interior member parallel to each of the first member and the second member and extending from the first side member to the second side member, wherein a region between the second member and the interior member is configured to include at least one electrical component.

15. The display system of claim 14, wherein the region is configured to include at least one of a power supply, a controller, electrical circuitry, or electrical wiring.

16. The display system of claim 14, wherein at least a portion of the display panel is configured to protrude beyond the first mounting member and the second mounting member.

17. The display system of claim 14, wherein each of the interior member, the second member, the first side member, and the second side member comprise aluminum.

18. The display system of claim 14, wherein at least one of the second member and the interior member comprises aluminum sheet metal.

19. The display system of claim 14, wherein at least one display panel of the plurality of display panels further includes a trim cap extending outwardly from the first member and configured to attach to a horizontally adjacent display panel.

20. The display system of claim 14, wherein at least one display panel of the plurality of display panels further includes a region located proximate each of the first side member and the first mounting member and configured to include at least one electrical component.

21. The display system of claim 14, wherein at least one display panel of the plurality of display panels further includes a region located proximate each of the second side member and the second mounting member and configured to include at least one electrical component.

22. The display system of claim 14, further comprising a plurality of support members, wherein each support member of the plurality of support members is substantially parallel to each of the first member and the second member and extends from the interior member toward the first member.

23. The display system of claim 5, wherein at least one panel of the plurality of display panels includes;
- a first side member and a second side member opposite the first side member, each of the first side member and the second side member extending from a first member to a second member, wherein the first side member is configured to be attached to at least one mounting member and the second side member is configured to be attached to at least one other mounting member; and
- an interior member positioned between and substantially parallel to each of the first member and the second member and extending from the first side member to the second side member, wherein a region between the second member and the interior member is configured to store at least one electrical component.

24. The display system of claim 23, wherein at least one of a power supply, a controller, electrical circuitry, and electrical wiring is positioned within the region.

* * * * *